United States Patent
Ma et al.

(10) Patent No.: US 9,681,142 B2
(45) Date of Patent: Jun. 13, 2017

(54) METHODS AND APPARATUS FOR MOTION COMPENSATION WITH SMOOTH REFERENCE FRAME IN BIT DEPTH SCALABILITY

(75) Inventors: Zhan Ma, Brooklyn, NY (US); Jiancong Luo, West Windsor, NJ (US); Yin Peng, Ithaca, NY (US)

(73) Assignee: THOMSON LICENSING DTV, Issy les Moulineaux (FR)

( * ) Notice: Subject to any disclaimer, the term of this patent is extended or adjusted under 35 U.S.C. 154(b) by 508 days.

(21) Appl. No.: 13/138,342

(22) PCT Filed: Dec. 11, 2009

(86) PCT No.: PCT/US2009/006528
§ 371 (c)(1),
(2), (4) Date: Aug. 2, 2011

(87) PCT Pub. No.: WO2010/090630
PCT Pub. Date: Aug. 12, 2010

(65) Prior Publication Data
US 2011/0293013 A1    Dec. 1, 2011

Related U.S. Application Data

(60) Provisional application No. 61/149,495, filed on Feb. 3, 2009.

(51) Int. Cl.
*H04N 7/32* (2006.01)
*H04N 7/26* (2006.01)
*H04N 19/34* (2014.01)
*H04N 19/51* (2014.01)
*H04N 19/33* (2014.01)
*H04N 19/577* (2014.01)

(52) U.S. Cl.
CPC ............ *H04N 19/34* (2014.11); *H04N 19/33* (2014.11); *H04N 19/51* (2014.11); *H04N 19/577* (2014.11)

(58) Field of Classification Search
CPC ............... H04N 7/32; H04N 19/00024; H04N 19/00321; H04N 19/00424;
(Continued)

(56) References Cited

U.S. PATENT DOCUMENTS 7,983,496 B2   7/2011   Liu et al.
3,014,445 A1   9/2011   Segall et al.
(Continued)

FOREIGN PATENT DOCUMENTS

JP   2007243942 A   9/2007
JP   200910943 A    1/2009
(Continued)

OTHER PUBLICATIONS

ITU-T H.264 Standard, "Advanced Video Coding for Generic Audiovisual Services", Series H: Audiovisual and Multimedia Systems, Infrastructure of Audiovisual Services—Coding of Moving Video, Mar. 2005.
(Continued)

*Primary Examiner* — Neil Mikeska
(74) *Attorney, Agent, or Firm* — Brian J. Dorini; Ronald J. Kolczynski

(57) ABSTRACT

Methods and apparatus are provided for motion compensation with a smooth reference frame in bit depth scalability. An apparatus includes an encoder for encoding picture data for at least a portion of a picture by generating an inter-layer residue prediction for the portion using an inverse tone mapping operation performed in the pixel domain for bit depth scalability. The inverse tone mapping operation is shifted from a residue domain to the pixel domain.

29 Claims, 4 Drawing Sheets

(58) Field of Classification Search
CPC ....... H04N 19/00436; H04N 19/00442; H04N 19/00545; H04N 19/00733; H04N 19/0077
USPC ........................................ 375/240.12, 240.16
See application file for complete search history.

(56) References Cited

U.S. PATENT DOCUMENTS

| | | |
|---|---|---|
| 2006/0133503 A1 | 6/2006 | Park et al. |
| 2006/0153300 A1 | 7/2006 | Wang et al. |
| 2007/0160136 A1 | 7/2007 | Lee et al. |
| 2007/0201560 A1 | 8/2007 | Segall et al. |
| 2008/0165848 A1 | 7/2008 | Ye et al. |
| 2009/0003437 A1* | 1/2009 | Cho et al. ................. 375/240.03 |
| 2009/0003457 A1* | 1/2009 | Liu et al. ................. 375/240.25 |
| 2009/0097549 A1* | 4/2009 | Kim et al. ................. 375/240.03 |
| 2009/0219994 A1* | 9/2009 | Tu et al. ................. 375/240.08 |
| 2010/0220789 A1* | 9/2010 | Yuwen et al. ........... 375/240.16 |
| 2010/0260260 A1* | 10/2010 | Wiegand et al. ........ 375/240.12 |

FOREIGN PATENT DOCUMENTS

| | | |
|---|---|---|
| WO | WO2008049446 | 5/2008 |
| WO | WO-2008086377 A1 | 7/2008 |
| WO | WO2009000110 | 12/2008 |
| WO | WO-2009003499 A1 | 1/2009 |
| WO | WO2009051692 | 4/2009 |

OTHER PUBLICATIONS

Ye et al., "Improved Intra Coding", ITU—Telecommunications Standardization Sector, Document: VCEG-AG11, 33rd Meeting: Shenzhen, China, Oct. 20, 2007.

Segall et al., "Tone Mapping SEI Message", JVT of ISO/IEC MPEG & ITU-T VCEG, Document: JVT-T060, 20th Meeting: Klagenfurt, Austria, Jul. 17-21, 2006.

Gao et al., "Applications and Requirement for Color Bit Depth Scalability", JVT of ISO/IEC MPEG & ITU-T VCEG, Document: JVT-U049, 21st Meeting: Hangzhou, China, Oct. 20-27, 2006.

Wiegand et al., "Joint Draft 8 of SVC Amendment", JVT of ISO/IEC MPEG & ITU-T VCEG, Document: JVT-U201, 21st Meeting: Hangzhou, China, Oct. 20-27, 2006.

Gao et al., "Simulation Results for CE2: SVC Bit-Depth Scalability", JVT of ISO/IEC MPEG & ITU-T VCEG, Document: JVT-X051, 24th Meeting: Geneva, CH, Jun. 29-Jul. 5, 2007.

Wu et al., "Study on Inter-Layer Prediction in Bit-Depth Scalability", JVT of ISO/IEC MPEG & ITU-T VCEG, Document: JVT-X052, 24th Meeting: Geneva, CH, Jun. 29-Jul. 5, 2007.

Winken et al., "CE2: SVC Bit-Depth Scalable Coding", JVT of ISO/IEC MPEG & ITU-T VCEG, Document: JVT-X057, 24th Meeting: Geneva, CH, Jun. 29-Jul. 5, 2007.

Segall et al., "CE2: Inter-Layer Prediction for Bit-Depth Scalable Coding", JVT of ISO/IEC MPEG & ITU-T VCEG, Document: JVT-X067, 24th Meeting: Geneva, Switzerland, Jun. 29-Jul. 5, 2007.

Schwarz et al., "Constrained Inter-Layer Prediction for Single-Loop Decoding in Spatial Scalability", Fraunhofer Institute for Telecommunications, Berlin, Germany, 2005 IEEE.

Winken et al, JVT-V078, "SVC_Bit_Dept_Scalability", 22nd Meeting, Marrakech, Morocco, Jan. 13-19, 2007, pp. 1-11.

Segall et al, JVT-W113, "System_for_Bit-Depth_Scalable_Coding", 23rd Meeting, San Jose, California, USA, Apr. 21-27, 2007, pp. 1-4.

* cited by examiner

METHODS AND APPARATUS FOR MOTION COMPENSATION WITH SMOOTH REFERENCE FRAME IN BIT DEPTH SCALABILITY

CROSS-REFERENCE TO RELATED APPLICATIONS

This application claims the benefit of U.S. Provisional Application Ser. No. 61/149,495, filed Feb. 3, 2009, which is incorporated by reference herein in its entirety.

TECHNICAL FIELD

The present principles relate generally to video encoding and decoding and, more particularly, to methods and apparatus for motion compensation with a smoothed reference frame in bit depth scalability.

BACKGROUND

Recently, digital images/videos with a bit depth greater than eight are increasingly desirable in many application fields such as, for example, medical image processing, digital cinema workflows in production and postproduction, home theater related applications, and so forth. Bit depth scalability is potentially useful considering the fact that at some time in the future, conventional eight bit depth and high bit depth digital imaging systems will simultaneously exist. There are several ways to handle the coexistence of an 8-bit video and a 10-bit video. In a first prior solution, only a 10-bit coded bit-stream is transmitted and the 8-bit representation for standard 8-bit display devices is obtained by applying tone mapping methods to the 10-bit presentation. In a second prior art solution, a simulcast bit-stream is transmitted that includes an 8-bit coded presentation and 10-bit coded presentation. It is the preference of the decoder to choose which bit depth to decode. For example, a 10-bit capable decoder can decode and output a 10-bit video while a normal decoder supporting only 8-bits can just output an 8-bit video. The first prior art solution is inherently incompliant with the 8-bit profiles of the International Organization for Standardization/International Electrotechnical Commission (ISO/IEC) Moving Picture Experts Group-4 (MPEG-4) Part 10 Advanced Video Coding (AVC) standard/ International Telecommunication Union, Telecommunication Sector (ITU-T) H.264 Recommendation (hereinafter the "MPEG-4 AVC Standard"). The second prior art solution is compliant to all the current standards but requires more overhead. However, a good tradeoff between the bit reduction and backward standard compatibility can be a scalable solution. Scalable video coding (SVC), which is also known as a scalable extension of the MPEG-4 AVC Standard, is considering the support of bit depth scalability. There are at least three advantages of bit depth scalable coding over post-processing or simulcast. One advantage is that bit depth scalable coding enables 10-bit video in a backward-compatible manner with the High Profiles of the MPEG-4 AVC Standard. A second advantage is that bit depth scalable coding enables adaptation to different network bandwidths or device capabilities. A third advantage is that bit depth scalable coding provides low complexity, high efficiency and high flexibility.

MPEG-4 AVC SVC Extension

In the current version of the SVC extension of the MPEG-4 AVC Standard, single-loop decoding is supported to reduce decoding complexity. The complete decoding, including motion-compensated prediction and deblocking, of the inter-coded macroblocks is only required for the current spatial or coarse-grain scalability (CGS) layer. This is realized by constraining the inter-layer intra texture prediction to those parts of the lower layer picture that are coded with intra macroblocks. To extend inter-layer intra texture prediction for bit depth scalability, inverse tone mapping is used. SVC also supports inter-layer residue prediction. Since tone mapping is typically used in the pixel domain, it is very hard to find a corresponding inverse tone mapping in the residue domain. In third and fourth prior art approaches, bit shift is used for inter-layer residue prediction.

In the joint draft 8 (JD8) of the scalable video coding (SVC) extension of the MPEG-4 AVC Standard, hereinafter also referred to as the third prior art approach, a technique referred to as smooth reference prediction (SRP) is proposed. A one-bit syntax element smoothed_reference_flag is sent when the syntax elements residual_prediction_flag and base_mode_flag are both set. When smoothed_reference_flag=1, the following steps are taken at the decoder to obtain the reconstructed video block:

1. The prediction block P is obtained using the enhancement layer reference frames and up-sampled motion vectors from the base layer.
2. The corresponding base layer residual block $r_b$ is up-sampled and $U(r_b)$ is added to P to form $P+U(r_b)$.
3. A smoothing filter with tap [1,2,1] is applied, first in the horizontal direction and then in the vertical direction, to obtain $S(P+U(r_b))$.
4. The enhancement layer residual block is added to the result of immediately preceding step (3) to obtain the reconstruction block $R=S(P+U(r_b))+r_e$.

Further, a fourth prior art approach proposes techniques for inter-layer residue prediction for BDS (Bit Depth Scalability). The fourth prior art approach converts the inverse tone mapping problem from the residue domain to the pixel domain for inter-layer residue prediction. If inter-layer residue prediction is used, then inverse tone mapping is applied to the sum of the tone mapped motion compensated prediction and the up-sampled residue from the base layer. When inter-layer residue prediction is used, the following steps are taken at the decoder to obtain the reconstructed video block:

1. The prediction block P is obtained using the enhancement layer reference frames and then P is tone mapped into the base layer bit depth to obtain T(P).
2. The corresponding base layer residual block $r_b$ is spatially up-sampled and $U(r_b)$ is added to P to form $T(P)+U(r_b)$.
3. A filter is used to obtain $S(T(P)+U(r_b))$.
4. Inverse tone mapping is then applied to obtain $T^{-1}(S(T(P)+U(r_b)))$.
5. The enhancement layer residual block is added to the result of immediately preceding step (4) to obtain the reconstruction block $R=T^{-1}(S(T(P)+U(r_b)))+r_e$.

However, all of the preceding prior art solutions are deficient. For example, the third prior art approach cannot handle different bit depths in the enhancement and base layers, due to the lack of tone mapping and inverse tone mapping operations. Moreover, with respect to the fourth prior art approach, there is room for improvement in the accuracy of the enhancement layer prediction.

SUMMARY

These and other drawbacks and disadvantages of the prior art are addressed by the present principles, which are directed to methods and apparatus for motion compensation with a smoothed reference frame in bit depth scalability.

According to an aspect of the present principles, there is provided an apparatus. The apparatus includes an encoder for encoding picture data for at least a portion of a picture by generating an inter-layer residue prediction for the portion using an inverse tone mapping operation performed in the pixel domain for bit depth scalability. The inverse tone mapping operation is shifted from a residue domain to the pixel domain.

According to another aspect of the present principles, there is provided a method. The method includes encoding picture data for at least a portion of a picture by generating an inter-layer residue prediction for the portion using an inverse tone mapping operation performed in the pixel domain for bit depth scalability. The inverse tone mapping operation is shifted from a residue domain to the pixel domain.

According to yet another aspect of the present principles, there is provided an apparatus. The apparatus includes a decoder for decoding picture data for at least a portion of a picture by generating an inter-layer residue prediction for the portion using an inverse tone mapping operation performed in the pixel domain for bit depth scalability. The inverse tone mapping operation is shifted from a residue domain to the pixel domain.

According to still another aspect of the present principles, there is provided a method. The method includes decoding picture data for at least a portion of a picture by generating an inter-layer residue prediction for the portion using an inverse tone mapping operation performed in the pixel domain for bit depth scalability. Therein the inverse tone mapping operation is shifted from a residue domain to the pixel domain.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
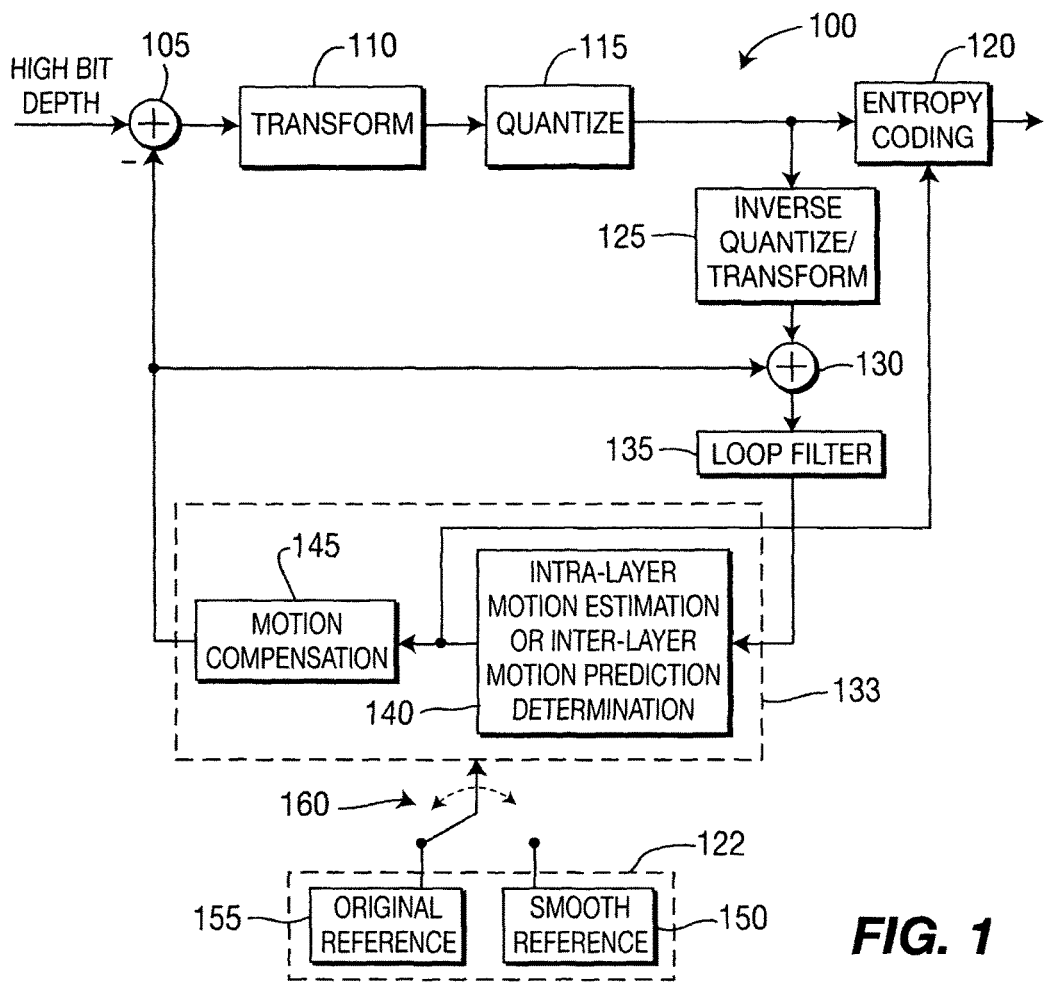
FIG. 1 is a block diagram showing an exemplary video encoder using inter-layer residual prediction for bit depth scalability, in accordance with an embodiment of the present principles.

The present principles are directed to methods and apparatus for motion compensation with a smooth reference frame in bit depth scalability.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

For the purposes of describing the present principles as well as the prior art, the terms low bit depth and high bit depth are used herein. These terms are used to define two different levels of bit depth definition. High bit depth is characterized in that it is at a higher bit depth than the low bit depth and, therefore, is a relative term. For purposes of discussion and illustration, a low bit depth is presumed to be 8 bits, while a high bit depth is presumed to be 10 bits. Due to the relative nature of these terms low bit depth and high bit depth, it is easily seen that the requirement here is that the low bit depth is less than the high bit depth, otherwise the terms are arbitrary. Thus, for example, the low bit depth may be 4 bit, 6 bit, or for that matter 12 bit, as the only requirement is that the high bit depth envisioned is greater than that of the low bit depth. Therefore, if it is presumed that a bit depth of 12 bits is defined as the low bit depth, then high bit depth may be considered 14 bits, 16 bits, or any other bit depth greater than 12. Here, where discussion and illustration of the present principles presumes a low bit depth is equal to 8 bits, the requirement for a high bit depth would be anything greater than 8 bits (10 bits are presumed here for the discussion, but could easily encompass a bit depth of 12 bits, 14 bits, or any other bit depth greater than 8). Another way to describe the comparison of low and high bit depth is base layer bit depth and enhanced layer bit depth, with the enhanced layer bit depth being greater than the base layer bit depth. Hence, it is to be appreciated that while one or more embodiments of the present principles involve the use of a 10-bit picture as an example for high bit depth, the present principles are not limited to the same and, thus, use of the present principles involving high bit depth can take on other values (than 10) that are greater than eight including, but not limited to, 12 bit, 14 bit, and so forth.

Moreover, as used herein, the words "picture" and "image" are used interchangeably and refer to a still image or a picture from a video sequence. As is known, a picture may be a frame or a field.

Further, it is to be appreciated that while one or more embodiments of the present principles are described herein with respect to the scalable video coding (SVC) extension of the MPEG-4 AVC standard, the present principles are not limited to solely this extension and/or this standard and, thus, may be utilized with respect to other video coding standards, recommendations, and extensions thereof, while maintaining the spirit of the present principles.

Turning to FIG. 1, an exemplary video encoder using inter-layer residual prediction for bit depth scalability is indicated generally by the reference numeral 100. The video encoder 100 includes a combiner 105 having an output in signal communication with an input of a transformer 110. An output of the transformer 110 is connected in signal communication with an input of a quantizer 115. An output of the quantizer 115 is connected in signal communication with a first input of an entropy coder 120 and an input of an inverse quantizer/inverse transformer 125. An output of the inverse quantizer/inverse transformer 125 is connected in signal communication with a first non-inverting input of a combiner 130. An output of the combiner 130 is connected in signal communication with an input of a loop filter 135. An output of the loop filter 135 is connected in signal communication with an input of a device 140 for intra-layer motion estimation or inter-layer motion prediction determination. An output of the device 140 is connected in signal communication with a second input of the entropy coder 120 and an input of a motion compensator 145. An output of the motion compensator 145 is connected in signal communication with a second non-inverting input of the combiner 130 and an inverting input of a combiner 105. The device 140 and the motion compensator 145 are included in a device 133. A reference provider 222 includes a smooth reference provider 150 and an original reference provider 155. An output of the original reference provider 155 is connected in signal communication with a first input of a switch 160. An output of the smooth reference provider 150 is connected in signal communication with a second input of a switch 160. An output of the switch 160 is connected in signal communication with the device 133, and may be provided to the device 140 and/or the motion compensator 145. A non-inverting input of the combiner 105 is available as an input of the video encoder 100, for receiving a high bit depth signal. An output of the entropy coder 120 is available as an output of the video encoder 100, for outputting a high bit depth bitstream.

Figure 2:
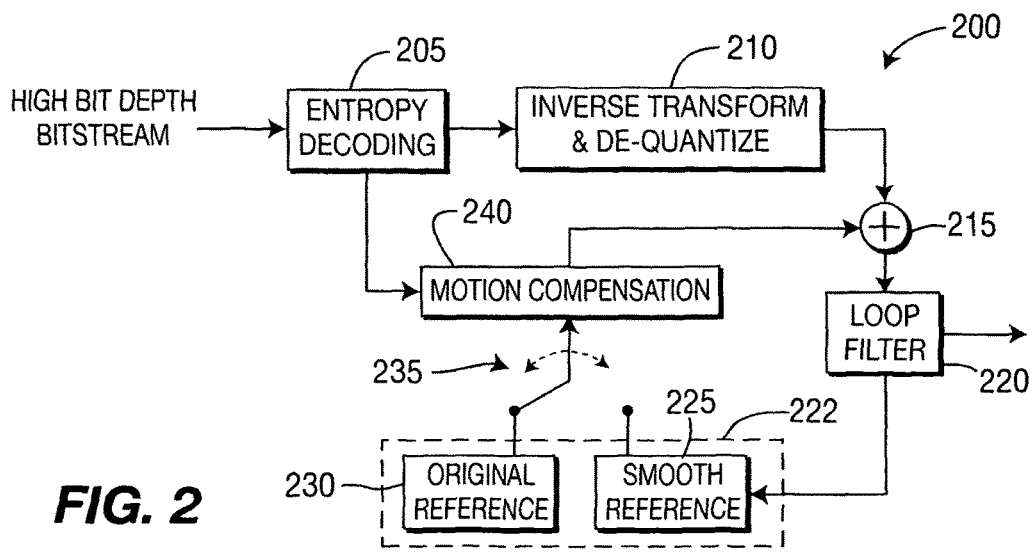
FIG. 2 is a block diagram showing an exemplary video decoder using inter-layer residual prediction for bit depth scalability, in accordance with an embodiment of the present principles.

Turning to FIG. 2, an exemplary video decoder using inter-layer residual prediction for bit depth scalability is indicated generally by the reference numeral 200. The video decoder 200 includes an entropy decoder 205 having a first output in signal communication with an input of an inverse transformer and de-quantizer 210. An output of the inverse transformer and de-quantizer 210 is connected in signal communication with a first non-inverting input of a combiner 215. An output of the combiner 215 is connected in signal communication with an input of a loop filter 220. A first output of the loop filter 220 is connected in signal communication with an input of a reference provider 222. The reference provider 222 includes an original reference provider 230 and a smooth reference provider 225. An output of the original reference provider 230 is connected in signal communication with a first input of a switch 235. An output of the smooth reference provider 240 is connected in signal communication with a second input of the switch 235. An output of the switch is connected to a first input of a motion compensator 240. An output of the motion compensator 240 is connected in signal communication with a second non-inverting input of the combiner 215. A second output of the entropy decoder 205 is connected in signal communication with a second input of the motion compensator 240. An input of the entropy decoder 205 is available as an input of the video decoder 200, for receiving a high bit depth bitstream. A second output of the loop filter 220 is available as an output of the video decoder 200, for outputting high bit depth pictures.

In accordance with the present principles, we propose the use of an inverse tone mapped smooth reference as a reference frame for motion compensation. In an embodiment, we convert the inverse tone mapping problem from the residue domain to the pixel domain for inter-layer residue prediction. For the sake of illustration, one or more embodiments are described herein where only bit depth scalability is involved and a single loop decoding architecture is used. However, it is to be appreciated that the present principles are not limited to the preceding and, thus, given the teachings of the present principles provided herein, may be readily extended by one of ordinary skill in this and related arts to involve combined scalability, such as bit depth and spatial scalability, and so forth, as well as multiple-loop decoding architectures, while maintaining the spirit of the present principles.

We propose adding a coding mode that uses an alternative smooth reference for motion compensation. The alternative smooth reference is built using a reference frame in the enhancement layer and motion and residual data from the base layer.

Figure 3:
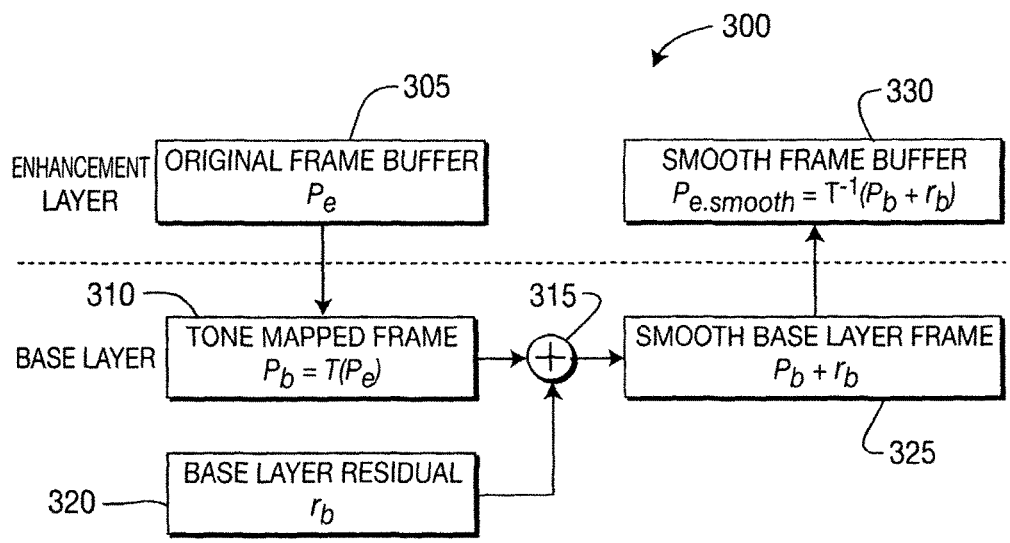
FIG. 3 is a high level block diagram showing an example of smooth reference creation using an original reference and base layer residual information, in accordance with an embodiment of the present principles.

Turning to FIG. 3, an example of smooth reference creation using an original reference and base layer residual information is indicated generally by the reference numeral 300. An enhancement layer prediction $p_e$ 305 from an original frame buffer is tone mapped to obtain $p_b=T(p_e)$ 310. The tone mapped frame $p_b$ 310 is input to a first non-inverting input of a combiner 315. A base layer residual $r_b$ 320 is input to a second non-inverting input of the combiner 315. An output of the combiner 315 includes a smooth base layer frame $p_b+r_b$ 325. The smooth base layer frame $p_b+r_b$ 325 is inverse tone mapped to obtain $P_{e,\ smooth}=T^{-1}(P_b+r_b)$ 330.

A video encoding procedure in accordance with an embodiment of the present principles is as follows.

1. Use the following sub-steps to create an alternative reference frame $REF_{alt}$ for each block.

a. If the collocated base layer block is intra coded, then copy the inverse tone mapped decoded block. Otherwise, perform one of sub-steps b or c below.

b. In one embodiment, motion compensation is conducted using the 10-bit enhancement layer reference pictures and the base layer up-sampled motion data to form prediction block P. Then P is tone mapped to an 8-bit version image T(P).

c. In another embodiment, motion compensation is conducted using an 8-bit tone mapped reference picture from the enhancement layer and the up-sampled motion data from the base layer to form the prediction block T(P).

d. The corresponding base layer residual frame $r_b$ is spatially up-sampled to $U(r_b)$. Then add $U(r_b)$ to T(P) to form $T(P)+U(r_b)$.

e. A filter is used to obtain $S(T(P)+U(r_b))$.

f. Inverse tone mapping is then applied to obtain $T^{-1}(S(T(P)+U(r_b)))$.

2. Motion Estimation is then applied using $REF_{alt}$ as the reference frame. The motion vector my and residual $r_e$ are encoded and transmitted.

A flag smooth_ref_flag in macroblock (MB) level syntax is used to signal the use of this coding mode.

In another embodiment, this coding mode can be embedded in the INTER coding process such that one more entry pointing to the alternative reference is added to the reference list for the enhancement layer. With this embodiment, no flag is needed to signal the use of this coding mode.

Figure 4:
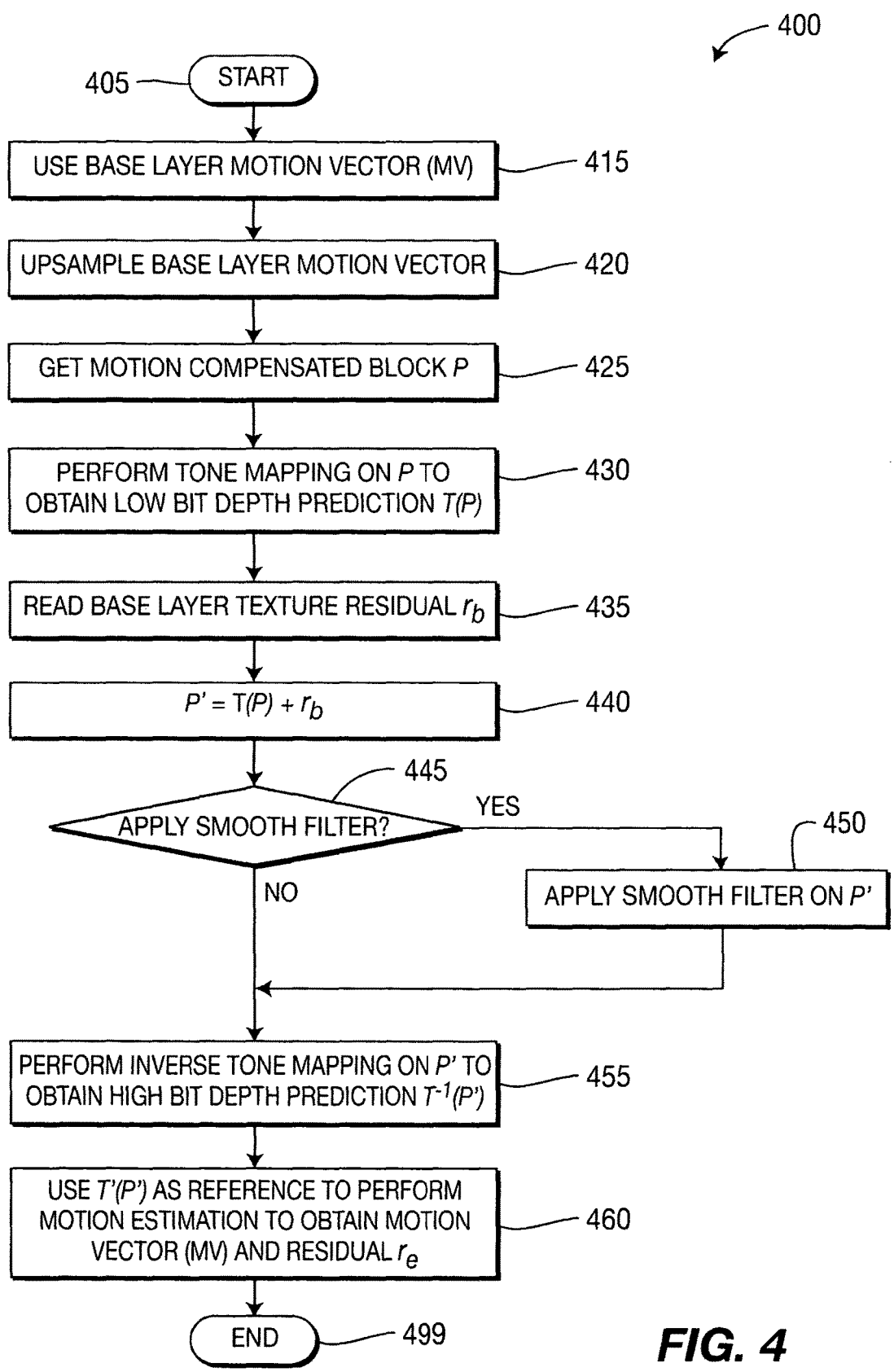
FIG. 4 is a flow diagram showing an exemplary method for inter-layer residual prediction for bit depth scalability in a video encoder, in accordance with an embodiment of the present principles.

Turning to FIG. 4, an exemplary method for inter-layer residual prediction for bit depth scalability in a video encoder is indicated generally by the reference numeral 400. The method 400 includes a start block 405 that passes control a function block 415. The function block 415 uses a base layer motion vector (mv), and passes control to a function block 420. The function block 420 up-samples the base layer motion vector, and passes control to a function block 425. The function block 425 gets a motion compensated block P corresponding to the current block, and passes control to as function block 430. The function block 430 performs tone mapping on the motion compensated block to obtain a low bit depth prediction T(P), and passes control to a function block 435. The function block 435 reads the base layer texture residual rb, and passes control to a function block 440. The function block 440 combines the base layer texture residual rb with the low bit depth prediction T(P) to obtain a smooth reference picture, namely $P'=T(P)+r_b$, and passes control to a decision block 445. The decision block 445 determines whether or not to apply the smooth reference. If so, then control is passed to a function block 450. Otherwise, control is passed to a function block 455.

The function block 450 applies a smooth filter on the smooth reference picture P', and passes control to the function block 455.

The function block 455 performs inverse tone mapping on P' to obtain a high bit depth prediction $T^{-1}(P')$, and passes control to a function block 460. The function block 460 uses T'(P') as a reference to perform motion estimation to obtain a motion vector (my) and an enhancement residual $r_e$, and passes control to an end block 499.

Figure 5:
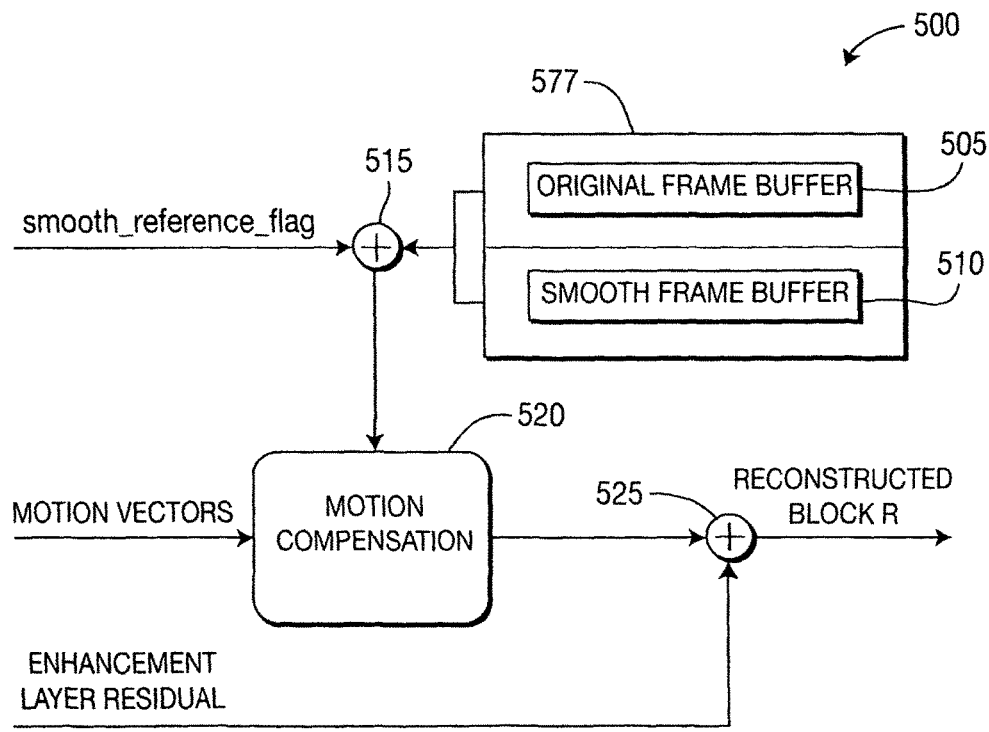
FIG. 5 is a high level block diagram showing an example of smooth reference decoding, in accordance with an embodiment of the preset principles.

Turning to FIG. 5, an example of smooth reference decoding is indicated generally by the reference numeral 500. An output of an original frame buffer 505 and an output of a smooth frame buffer 510 are connected in signal communication with a first non-inverting input of a combiner 515. An output of the combiner 515 is connected in signal communication with a first input of a motion compensator 520. An output of the motion compensator 520 is connected in signal communication with a first non-inverting input of a combiner 525. A second non-inverting input of the combiner 515 is available as an input for the smooth reference decoding 500, for receiving a smooth_reference_flag. A second input of the motion compensator 520 is available as an input of the smooth reference decoding 500, for receiving motion vectors. A second non-inverting input of the combiner 525 is available as an input of the smooth reference decoding 500, for receiving an enhancement layer residual. An output of the combiner 525 is available as an output of the smooth reference decoding 500, for outputting a reconstructed block R. The original frame buffer 505 and smooth frame buffer 510 are included in memory 577. While both the original frame buffer 505 and the smooth frame buffer 510 are shown with respect to a single memory 577, such buffers 505 and 510 may be stored in different memories. These and other variations are within the spirit of the present principles.

A video decoding procedure in accordance with an embodiment of the present principles is as follows.

1. Use the following sub-steps to create an alternative reference frame $REF_{alt}$ for each block.

a. If the collocated based layer block is intra coded, then copy the inverse tone mapped decoded block. Otherwise, perform one of sub-steps b or c below.

b. In one embodiment, motion compensation is conducted using the 10-bit enhancement layer reference pictures and the base layer up-sampled motion data to form prediction block P. Then P is tone mapped to an 8-bit version image T(P).

c. In another embodiment, motion compensation is conducted using an 8-bit tone mapped reference picture from the enhancement layer and the up-sampled motion data from the base layer to form the prediction block T(P).

d. The corresponding base layer residual frame $r_b$ is spatially up-sampled to $U(r_b)$. Then add $U(r_b)$ to T(P) to form $T(P)+U(r_b)$.

e. A filter is used to obtain $S(T(P)+U(r_b))$.

f. Inverse tone mapping is then applied to obtain $T^{-1}(S(T(P)+U(r_b)))$.

2. Motion compensation is then applied to obtain MC(REF$_{alt}$, mv), where mv, is the motion vector.

3. The enhancement layer residual block is added to the result of immediately preceding step (2) to obtain the reconstruction block R=MC(REF$_{alt}$, mv)+$r_e$.

Figure 6:
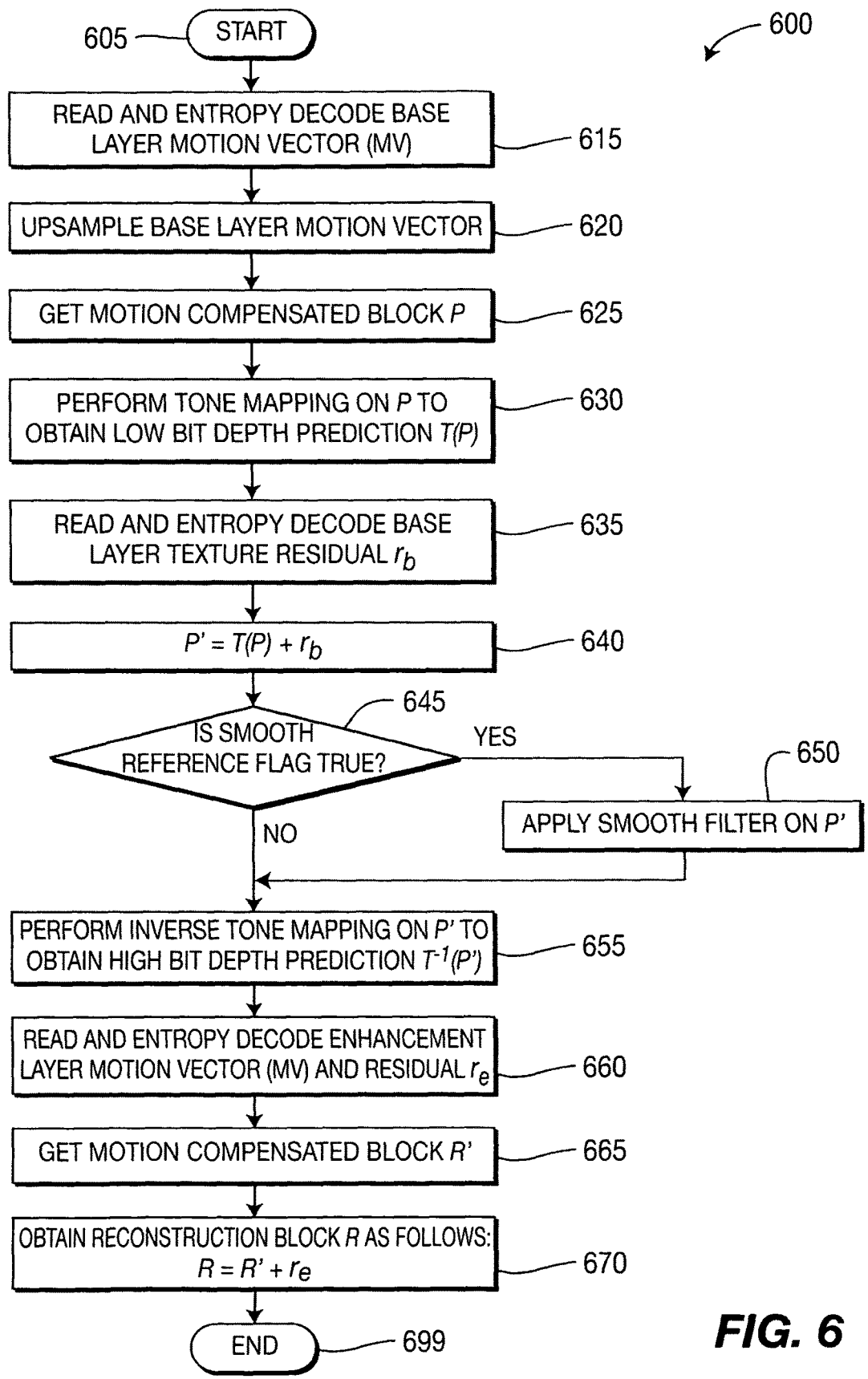
FIG. 6 is a flow diagram showing an exemplary method for inter-layer residual prediction for bit depth scalability in a video decoder, in accordance with an embodiment of the present principles.

Turning to FIG. 6, an exemplary method for inter-layer residual prediction for bit depth scalability in a video decoder is indicated generally by the reference numeral 600. The method 600 includes a start block 605 that passes control to a function block 615. The function block 615 reads and entropy decodes a base layer motion vector (mv), and passes control to a function block 620. The function block 620 up-samples the base layer motion vector (mv), and passes control to a function block 625. The function block 625 gets a motion compensated block P, and passes control to a function block 630. The function block 630 performs tone mapping on P to obtain a low bit depth prediction T(P), and passes control to a function block 635. The function block 635 reads and entropy decodes a base layer texture residual $r_b$, and passes control to a function block 640. The function block 640 combines the base layer texture residual rb with the low bit depth prediction T(P) to obtain a smooth reference picture, namely P'=T(P)+$r_b$, and passes control to a decision block 645. The decision block 645 determines whether or not the smooth reference flag is equal to true. If so, then control is passed to a function block 650. Otherwise, control is passed to a function block 655.

The function block 650 applies a smooth filter on the smooth reference picture P', and passes control to the function block 655.

The function block 655 performs inverse tone mapping on P' to obtain a high bit depth prediction $T^{-1}(P')$, and passes control to a function block 660. The function block 660 reads and entropy decodes a motion vector (mv) and an enhancement layer residual $r_e$, and passes to a function block 665. The function block 665 performs motion compensation to obtain block R', and passes to a function block 670. The function block 670 generates a reconstruction block R for the current block obtained by combining the high bit depth prediction $T^{-1}(P')$ with the enhancement layer residual re, namely $R=T^{-1}(P')+r_e$, and passes control to an end block 699.

A description will now be given of some of the many attendant advantages/features of the present invention, some of which have been mentioned above. For example, one advantage/feature is an apparatus having an encoder for encoding picture data for at least a portion of a picture by generating an inter-layer residue prediction for the portion using an inverse tone mapping operation performed in the pixel domain for bit depth scalability. The inverse tone mapping operation is shifted from a residue domain to the pixel domain.

Another advantage/feature is the apparatus having the encoder as described above, wherein the encoder generates the inter-layer residue prediction by performing motion compensation using an enhancement layer reference to generate an enhancement layer prediction, tone mapping the enhancement layer prediction to a base layer reference to generate a tone mapped prediction, combining a base layer residue for the portion with the tone mapped prediction to obtain a smooth base layer reference, and inverse tone mapping the smooth base layer reference to generate an inverse tone mapped prediction. The encoder performs motion estimation and motion compensation using the inverse tone mapped prediction to obtain a motion vector, and encodes and transmits the motion vector and an error between the inverse tone mapped prediction and the input picture.

Yet another advantage/feature is the apparatus having the encoder that at least performs the motion compensation as described above, wherein the motion compensation is performed using the enhancement layer reference and base layer up-sampled motion data to generate the enhancement layer prediction. The enhancement layer reference has a same bit depth as the base layer reference.

Still another advantage/feature is the apparatus having the encoder that at least performs the motion compensation as described above, wherein the motion compensation is performed using the enhancement layer reference and base layer up-sampled motion data to generate the enhancement layer prediction. The enhancement layer reference has a greater bit depth than the base layer reference.

Moreover, another advantage/feature is the apparatus having the encoder that at least performs the motion compensation as described above, wherein the base layer residue is spatially up-sampled to obtain a spatially up-sampled base layer residue, and the spatially up-sampled base layer residue is combined with the tone mapped prediction to obtain the smooth base layer reference.

Further, another advantage/feature is the apparatus having the encoder that at least performs the motion compensation as described above, wherein a flag in a macroblock level syntax is used to signal a use of an inter-layer residue prediction mode corresponding to generating the inter-layer residue prediction.

Also, another advantage/feature is the apparatus having the encoder that at least performs the motion compensation as described above, wherein an inter-layer residue prediction mode corresponding to generating the inter-layer residue prediction is sent embedded in existing inter modes such that an entry pointing to the smooth base layer reference is added to an existing reference list for the enhancement layer.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a portion of a picture, comprising:
circuitry that generates an inverse tone mapped inter-layer residue prediction for the portion by combining a tone mapped enhancement layer frame with a base layer residual and base layer motion data to form an alternative smooth base layer reference frame, and
motion compensation circuitry that uses an inverse tone mapping operation on said smooth base layer reference frame in the enhancement layer, performed in the pixel domain for bit depth scalability, for motion compensation, and
a switch that switches to an original reference to use for motion compensation, based on a determination between intra-layer motion estimation and inter-layer motion prediction, and
wherein the inverse tone mapping operation is shifted from a residue domain to the pixel domain.

2. The apparatus of claim 1, wherein said encoder generates the inverse tone mapped inter-layer residue prediction by performing motion compensation using an enhancement layer reference to generate an enhancement layer prediction, tone mapping the enhancement layer prediction to a base layer reference to generate a tone mapped prediction, combining a base layer residue for the portion with the tone mapped prediction to obtain a smooth base layer reference, and inverse tone mapping the smooth base layer reference to generate an inverse tone mapped prediction, and wherein said encoder performs motion estimation and motion compensation using the inverse tone mapped prediction to obtain a motion vector, and encodes and transmits the motion vector and an error between the inverse tone mapped prediction and the picture.

3. The apparatus of claim 2, wherein the motion compensation is performed using the enhancement layer reference and base layer up-sampled motion data to generate the enhancement layer prediction, the enhancement layer reference having a same bit depth as the base layer reference.

4. The apparatus of claim 2, wherein the motion compensation is performed using the enhancement layer reference and base layer up-sampled motion data to generate the enhancement layer prediction, the enhancement layer reference having a greater bit depth than the base layer reference.

5. The apparatus of claim 2, wherein the base layer residue is spatially up-sampled to obtain a spatially up-sampled base layer residue, and the spatially up-sampled base layer residue is combined with the tone mapped prediction to obtain the smooth base layer reference.

6. The apparatus of claim 2, wherein a flag in a macroblock level syntax is used to signal a use of an inter-layer residue prediction mode corresponding to generating the inter-layer residue prediction.

7. The apparatus of claim 2, wherein an inter-layer residue prediction mode corresponding to generating the inter-layer residue prediction is sent embedded in existing inter modes such that an entry pointing to the smooth base layer reference is added to an existing reference list for the enhancement layer.

8. A method, comprising:
encoding picture data for at least a portion of a picture by generating an inverse tone mapped inter-layer residue prediction for the portion by combining a tone mapped enhancement layer frame with a base layer residual and base layer motion data to form an alternative smooth base layer reference frame, and then using an inverse tone mapping operation on said smooth base layer reference frame in the enhancement layer, performed in the pixel domain for bit depth scalability, for motion compensation, or switching to an original reference to use for motion compensation, based on a determination between intra-layer motion estimation and inter-layer motion prediction, and
wherein the inverse tone mapping operation is shifted from a residue domain to the pixel domain.

9. The method of claim 8, wherein generating the inverse tone mapped inter-layer residue prediction comprises:
performing motion compensation using an enhancement layer reference to generate an enhancement layer prediction;
tone mapping the enhancement layer prediction to a base layer reference to generate a tone mapped prediction;
combining a base layer residue for the portion with the tone mapped prediction to obtain a smooth base layer reference; and
inverse tone mapping the smooth base layer reference to generate an inverse tone mapped prediction, and
wherein said encoding step further comprises:
performing motion estimation and motion compensation using the inverse tone mapped prediction to obtain a motion vector, and
encoding and transmitting the motion vector and an error between the inverse tone mapped prediction and the picture.

10. The method of claim 9, wherein the motion compensation is performed using the enhancement layer reference and base layer up-sampled motion data to generate the enhancement layer prediction, the enhancement layer reference having a same bit depth as the base layer reference.

11. The method of claim 9, wherein the motion compensation is performed using the enhancement layer reference and base layer up-sampled motion data to generate the enhancement layer prediction, the enhancement layer reference having a greater bit depth than the base layer reference.

12. The method of claim 9, wherein the base layer residue is spatially up-sampled to obtain a spatially up-sampled base layer residue, and the spatially up-sampled base layer residue is combined with the tone mapped prediction to obtain the smooth base layer reference.

13. The method of claim 9, wherein a flag in a macroblock level syntax is used to signal a use of an inter-layer residue prediction mode corresponding to generating the inter-layer residue prediction.

14. The method of claim 9, wherein an inter-layer residue prediction mode corresponding to generating the inverse tone mapped inter-layer residue prediction is sent embedded in existing inter modes such that an entry pointing to the smooth base layer reference is added to an existing reference list for the enhancement layer.

15. An apparatus, comprising:
 a decoder for decoding picture data for at least a portion of a picture, comprising:
 circuitry that generates an inverse tone mapped inter-layer residue prediction for the portion by combining a tone mapped enhancement layer frame with a base layer residual and base layer motion data to form an alternative smooth base layer reference frame, and
 motion compensation circuitry that uses an inverse tone mapping operation on said smooth base layer reference frame in the enhancement layer, performed in the pixel domain for bit depth scalability, for motion compensation, and
 a switch that switches to an original reference to use for motion compensation, based on a determination between intra-layer motion estimation and inter-layer motion prediction, and
 wherein the inverse tone mapping operation is shifted from a residue domain to the pixel domain.

16. The apparatus of claim 15, wherein said decoder generates the inverse tone mapped inter-layer residue prediction by performing motion compensation using an enhancement layer reference to generate an enhancement layer prediction, tone mapping the enhancement layer prediction to a base layer reference to generate a tone mapped prediction, combining a base layer residue for the portion with the tone mapped prediction to obtain a smooth base layer reference, and inverse tone mapping the smooth base layer reference to generate an inverse tone mapped prediction, and wherein said decoder performs motion estimation and motion compensation using the inverse tone mapped prediction to obtain a motion vector, and generates a reconstructed version of the portion based upon the motion vector and an error between the inverse tone mapped prediction and the picture.

17. The apparatus of claim 16, wherein the motion compensation is performed using the enhancement layer reference and base layer up-sampled motion data to generate the enhancement layer prediction, the enhancement layer reference having a same bit depth as the base layer reference.

18. The apparatus of claim 16, wherein the motion compensation is performed using the enhancement layer reference and base layer up-sampled motion data to generate the enhancement layer prediction, the enhancement layer reference having a greater bit depth than the base layer reference.

19. The apparatus of claim 16, wherein the base layer residue is spatially up-sampled to obtain a spatially up-sampled base layer residue, and the spatially up-sampled base layer residue is combined with the tone mapped prediction to obtain the smooth base layer reference.

20. The apparatus of claim 16, wherein a flag in a macroblock level syntax is used to signal a use of an inter-layer residue prediction mode corresponding to generating the inter-layer residue prediction.

21. The apparatus of claim 16, wherein an inter-layer residue prediction mode corresponding to generating the inter-layer residue prediction is received embedded in existing inter modes such that an entry pointing to the smooth base layer reference is added to an existing reference list for the enhancement layer.

22. A method, comprising:
 decoding picture data for at least a portion of a picture by generating an inter-layer residue prediction for the portion by combining a tone mapped enhancement layer frame with a base layer residual and base layer motion data to form an alternative smooth base layer reference frame, and then using an inverse tone mapping operation on said smooth base layer reference frame in the enhancement layer, performed in the pixel domain for bit depth scalability, for motion compensation, or switching to an original reference to use for motion compensation, based on a determination between intra-layer motion estimation and inter-layer motion prediction, and
 wherein the inverse tone mapping operation is shifted from a residue domain to the pixel domain.

23. The method of claim 22, wherein generating the inverse tone mapped inter-layer residue prediction comprises:
 performing motion compensation using an enhancement layer reference to generate an enhancement layer prediction;
 tone mapping the enhancement layer prediction to a base layer reference to generate a tone mapped prediction;
 combining a base layer residue for the portion with the tone mapped prediction to obtain a smooth base layer reference; and
 inverse tone mapping the smooth base layer reference to generate an inverse tone mapped prediction, and
 wherein said decoding step comprises:
 performing motion estimation and motion compensation using the inverse tone mapped prediction to obtain a motion vector; and
 generating a reconstructed version of the portion based upon the motion vector and an error between the inverse tone mapped prediction and the picture.

24. The apparatus of claim 2 or claim 16 or method of claim 9 or claim 23, wherein the motion compensation is performed using the enhancement layer reference and base layer up-sampled motion data to generate the enhancement layer prediction, the enhancement layer reference having a same bit depth as the base layer reference.

25. The apparatus of claim 2 or claim 16 or method of claim 9 or claim 23, wherein the motion compensation is performed using the enhancement layer reference and base layer up-sampled motion data to generate the enhancement layer prediction, the enhancement layer reference having a greater bit depth than the base layer reference.

26. The apparatus of claim 2 or claim 16 or method of claim 9 or claim 23, wherein the base layer residue is spatially up-sampled to obtain a spatially up-sampled base layer residue, and the spatially up-sampled base layer residue is combined with the tone mapped prediction to obtain the smooth base layer reference.

27. The apparatus of claim 2 or claim 16 or method of claim 9 or claim 23, wherein a flag in a macroblock level syntax is used to signal a use of an inter-layer residue prediction mode corresponding to generating the inverse tone mapped inter-layer residue prediction.

28. The apparatus of claim 2 or claim 16 or method of claim 9 or claim 23, wherein an inter-layer residue prediction mode corresponding to generating the inverse tone mapped inter-layer residue prediction is received embedded in existing inter modes such that an entry pointing to the smooth base layer reference is added to an existing reference list for the enhancement layer.

29. A non-transitory computer-readable storage media having video signal data encoded thereupon, comprising:
  picture data for at least a portion of a picture encoded by generating an inverse tone mapped inter-layer residue prediction for the portion by combining a tone mapped enhancement layer frame with a base layer residual and base layer motion data to form an alternative smooth base layer reference frame, and then using an inverse tone mapping operation on said smooth base layer reference frame in the enhancement layer, performed in the pixel domain for bit depth scalability, for motion compensation, or switching to an original reference to use for motion compensation, based on a determination between intra-layer motion estimation and inter-layer motion prediction, and
  wherein the inverse tone mapping operation is shifted from a residue domain to the pixel domain.

* * * * *